United States Patent
Hu

(10) Patent No.: US 11,032,455 B2
(45) Date of Patent: Jun. 8, 2021

(54) FLASH, FLASH ADJUSTMENT METHOD, OPTICAL SYSTEM, AND TERMINAL

(71) Applicant: Huawei Technologies Co., Ltd., Shenzhen (CN)

(72) Inventor: Yichao Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 16/492,475

(22) PCT Filed: Jun. 6, 2017

(86) PCT No.: PCT/CN2017/087346
§ 371 (c)(1),
(2) Date: Sep. 9, 2019

(87) PCT Pub. No.: WO2018/161461
PCT Pub. Date: Sep. 13, 2018

(65) Prior Publication Data
US 2020/0236258 A1    Jul. 23, 2020

(30) Foreign Application Priority Data

Mar. 8, 2017  (CN) .......................... 201710134178.9

(51) Int. Cl.
*H04N 5/225* (2006.01)
*G02B 26/08* (2006.01)
(Continued)

(52) U.S. Cl.
CPC ....... *H04N 5/2256* (2013.01); *G02B 26/0825* (2013.01); *H04N 5/2354* (2013.01); *H04N 5/23212* (2013.01)

(58) Field of Classification Search
CPC ............ G02B 26/0825; H04N 5/2256; H04N 5/23212; H04N 5/2354; H05B 41/30
See application file for complete search history.

(56) References Cited

U.S. PATENT DOCUMENTS 6,573,939 B1 *  6/2003  Yokoyama ........... H04N 5/2256
                                                                348/375
7,369,723 B1 *  5/2008  Mescher .................. G02B 3/14
                                                                385/25
(Continued)

FOREIGN PATENT DOCUMENTS

CN        1811515 A      8/2006
CN      103797781 A      5/2014
(Continued)

OTHER PUBLICATIONS

Machine Translation and Abstract of Chinese Publication No. CN204378026, Jun. 10, 2015, 6 pages.
(Continued)

*Primary Examiner* — Amy R Hsu
(74) *Attorney, Agent, or Firm* — Conley Rose, P.C.

(57) ABSTRACT

The local light filling can be performed on a point in a photographed image. Alternatively, by adjusting an inner width of the flash chamber, the illumination field of view of the flash matches the focal length of the optical system to which the flash is applied, thereby implementing light concentration at a telephoto end and light scattering at a wide-angle end.

20 Claims, 9 Drawing Sheets

(51) Int. Cl.
*H04N 5/232* (2006.01)
*H04N 5/235* (2006.01)

(56) References Cited

U.S. PATENT DOCUMENTS

| | | | | |
|---|---|---|---|---|
| 2006/0170766 | A1* | 8/2006 | Kim | G02B 26/0825 348/51 |
| 2007/0110305 | A1* | 5/2007 | Corcoran | G06K 9/00228 382/167 |
| 2009/0274178 | A1* | 11/2009 | Gollier | G02B 26/0825 372/22 |
| 2010/0118414 | A1* | 5/2010 | Bolis | G02B 3/14 359/666 |
| 2011/0043682 | A1* | 2/2011 | Chou | H04N 5/23219 348/363 |
| 2012/0170920 | A1* | 7/2012 | Moreau | G02B 3/12 396/72 |
| 2013/0064531 | A1* | 3/2013 | Pillman | H04N 5/23296 396/62 |
| 2015/0234153 | A1* | 8/2015 | Park | G02B 13/0065 348/360 |
| 2017/0118397 | A1* | 4/2017 | Chang | G02B 27/0075 |
| 2017/0303043 | A1* | 10/2017 | Young | H04N 5/23296 |

FOREIGN PATENT DOCUMENTS

| | | |
|---|---|---|
| CN | 204378026 U | 6/2015 |
| CN | 204439988 U | 7/2015 |
| WO | 02101442 A1 | 2/2002 |

OTHER PUBLICATIONS

Machine Translation and Abstract of Chinese Publication No. CN204439988, Jul. 1, 2015, 5 pages.
Foreign Communication From a Counterpart Application, PCT Application No. PCT/CN2017/087346, English Translation of International Search Report dated Nov. 20, 2017, 2 pages.
Foreign Communication From a Counterpart Application, PCT Application No. PCT/CN2017/087346, English Translation of Written Opinion dated Nov. 20, 2017, 4 pages.

* cited by examiner

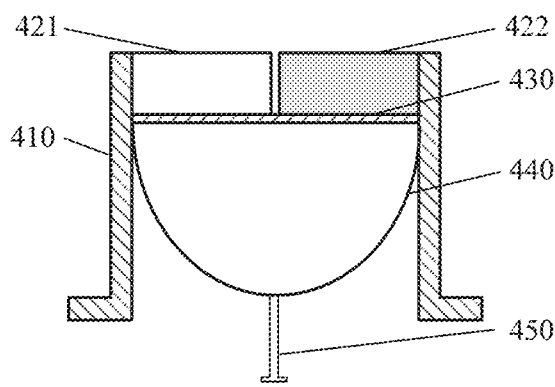
FIG. 4(a)
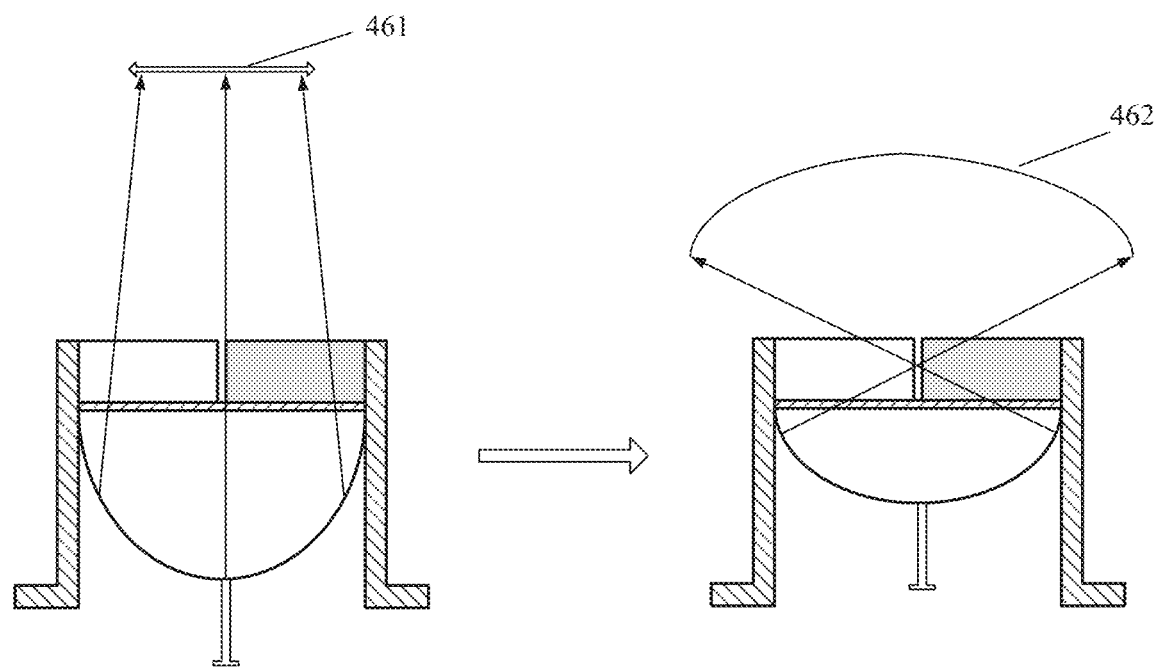
FIG. 4(b)
FIG. 4(c)

FLASH, FLASH ADJUSTMENT METHOD, OPTICAL SYSTEM, AND TERMINAL

CROSS-REFERENCE TO RELATED APPLICATIONS

This application is a U.S. National Stage of International Patent Application No. PCT/CN2017/087346 filed on Jun. 6, 2017, which claims priority to Chinese Patent Application No. 201710134178.9 filed on Mar. 8, 2017. Both of the aforementioned applications are hereby incorporated by reference in their entireties.

This application claims priority to Chinese Patent Application No. 201710134178.9, field with the Patent Office of China National Intellectual Property Administration on Mar. 8, 2017 and entitled "METHOD FOR ADJUSTING ILLUMINATION ANGLE OF FLASH, FLASH, AND DEVICE", which is incorporated herein by reference in its entirety.

TECHNICAL FIELD

The present invention relates to the field of flash technologies, and in particular, to a flash, a flash adjustment method, an optical system, and a terminal that can implement zoom linkage.

BACKGROUND

As demands on image recording increase, a large quantity of terminals having a photographing function, for example, smartphones and tablet computers, emerge in the market. Most of the terminals have a zoom function. However, flash technologies do not match the zoom function well. The flash technologies include determining a light-filling angle and strength.

In the prior art, Patent (201280044464.1) discloses a zoom flash with no movable parts. The zoom flash includes a plurality of fixed focal length illumination lenses. One or more light emitters are correspondingly positioned behind each of the illumination lenses. A flash controller selectively fires one or more corresponding light emitters behind different illumination lenses based on a selected field of view of an image forming system. In can be teamed from the above that the prior art has the following problems: (1) Continuous zoom linkage cannot be achieved. To be specific, a focal length of an illumination lens cannot continuously change as a focal length of a lens changes. As a result, the focal length of the lens fails to be matched. (2) Local light filling cannot be performed based on free clicking of a user in a view. (3) A light emitter can be fixedly fired based only on a focal length each time, and a plurality of light emitters cannot work in cooperation. Therefore, the full potential of the light emitters cannot be realized.

SUMMARY

Embodiments of the present invention provide a flash, a flash adjustment method, an optical system, and a terminal, to resolve at least one of the foregoing problems.

According to a first aspect, the embodiments of the present invention provide a flash. The flash is used in an optical system and includes a light source module, a flash chamber, and a flexible mirror reflector. The light source module is located inside the flash chamber. The light source module includes a substrate and at least one light emitting diode LED. The at least one LED is located on an upper surface of the substrate. The flexible mirror reflector is fixed on a lower surface of the substrate. A curvature of the flexible mirror reflector is adjustable. The adjustment of the curvature of the flexible mirror reflector enables an illumination field of view of the flash to match a focal length of the optical system. In the embodiments of the present invention, the flexible mirror reflector is used. By adjusting the curvature of the flexible mirror reflector, the illumination field of view of the flash matches the focal length of the optical system to which the flash is applied.

In a possible design, the flash further includes a piezoelectric element. The piezoelectric element covers an outer surface of the flexible mirror reflector, and is configured to adjust the curvature of the flexible mirror reflector, so that the illumination field of view of the flash matches the focal length of the optical system. According to such a design, the curvature of the flexible mirror reflector can be adjusted by using deformation of the piezoelectric element, so that the illumination field of view of the flash matches the focal length of the optical system to which the flash is applied, and local directional light filling can be performed on any point in a framing range.

In a possible design, the flash further includes a vertical bar. The vertical bar is connected to an outer surface of the flexible mirror reflector, and the vertical bar controls vertical stretching of the flexible mirror reflector by moving vertically, so that the illumination field of view of the flash matches the focal length of the optical system.

In a possible design, the flash further includes at least one horizontal bar. A horizontal bar hole is provided in a side wall of the flash chamber, the at least one horizontal bar passes through the horizontal bar hole, and the at least one horizontal bar moves to adjust the curvature of the flexible mirror reflector, so that the illumination field of view of the flash matches the focal length of the optical system.

According to a second aspect, the embodiments of the present invention provide a flash. The flash is used in an optical system and includes a light source module and a flash chamber. The light source module is located inside the flash chamber. The light source module includes a substrate and at least one light emitting diode LED. The at least one LED is located on an upper surface of the substrate. An inner surface of a side wall of the flash chamber is a reflective surface. The flash further includes a piezoelectric element. The piezoelectric element controls the flash chamber to stretch horizontally, so that an illumination field of view of the flash matches a focal length of the optical system.

In a possible design, a reflective surface is disposed above the piezoelectric element to reflect light emitted from the LED.

According to a third aspect, the embodiments of the present invention provide an optical system. The optical system includes the flash according to the first aspect or the second aspect.

In a possible design, the optical system further includes a liquid crystal display LCD. The LCD is configured to display a matching degree between a current focal length and a current light-filling strength. According to this design, the LCD is configured to display the matching degree between the current focal length and the current light-filling strength, so that a user is prompted to perform a corresponding operation to adjust brightness of an image. This produces a better photographing effect.

According to a fourth aspect, the embodiments of the present invention provide a terminal. The terminal includes the flash according to the first aspect or the second aspect or the optical system according to the third aspect.

According to a fifth aspect, the embodiments of the present invention provide a flash adjustment method. The method includes steps of: receiving a photographing input from a user through clicking; determining a focal length based on the photographing input from the user through clicking; and adjusting, by a flash, a light-filling angle and/or strength based on the focal length, so that an illumination field of view of the flash matches the focal length. According to the embodiments of the present invention, after the photographing input from the user through clicking is received, the focal length is adjusted based on the photographing input from the user through clicking. In addition, the flash adjusts the light-filling angle and/or strength based on the focal length, to implement smart linkage with the adjustment of a photographing focal length by the user. The flash automatically adjusts an illumination range and brightness as the focal length adjusted by the user changes. In this way, precise small-area light filling is implemented.

Compared with the prior art, the embodiments of the present invention provide the flash, the flash adjustment method, and the optical system, and the flexible mirror reflector is used. By adjusting the curvature of the flexible mirror reflector, the illumination field of view of the flash matches the focal length of the optical system to which the flash is applied. Furthermore, local light filling can be performed on a point in a photographed image. Alternatively, by adjusting an inner width of the flash chamber, the illumination field of view of the flash matches the focal length of the optical system to which the flash is applied, thereby implementing light concentration at a telephoto end and light scattering at a wide-angle end.

BRIEF DESCRIPTION OF DRAWINGS

FIG. 4(a) to FIG. 4(c) are schematic structural diagrams of another flash according to an embodiment of the present invention;

DESCRIPTION OF EMBODIMENTS

The following describes the technical solutions in the embodiments of the present invention with reference to the accompanying drawings in the embodiments of the present invention.

Figure 1:
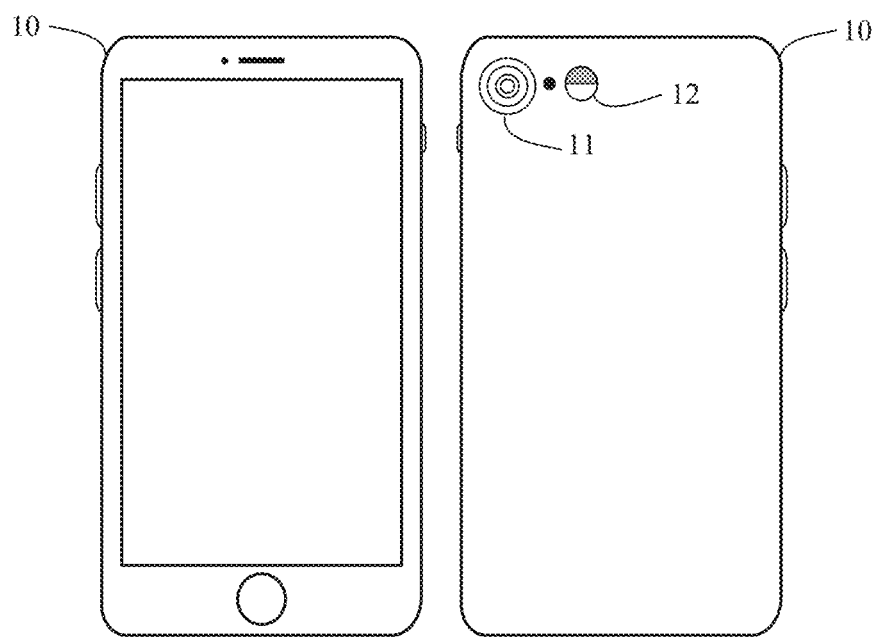
FIG. 1 is a schematic diagram of an application scenario according to an embodiment of the present invention.

FIG. 1 is a schematic diagram of an application scenario according to an embodiment of the present invention. As shown in FIG. 1, a flash 12 is mounted on a terminal 10, to work in cooperation with a lens 11. When a user enables a photographing or video shooting function of the terminal 12 and uses the lens 11 to shoot an image, the flash can increase exposure, especially in a dim place. Use of the flash helps lighten a scene. The flash can store high-voltage electricity by using a capacitor, and enables a flashtube to discharge electricity through pulse trigger, to provide a momentary flash of light. Alternatively, the flash may stay lit for a relatively long time of video shooting. It should be noted that the terminal 12 may be an electronic device having a photographing function, such as a mobile phone or a tablet computer. In addition, the terminal 12 may have a front-facing camera and a rear-facing camera. A flash may be disposed near the front-facing camera or the rear-facing camera, or a flash may be disposed near both the front-facing camera and the rear-facing camera. The terminal 10 invokes the flash to work in cooperation with any camera based on an actual shooting requirement.

According to the flash provided in this embodiment of the present invention, a flexible mirror reflector is used. By adjusting a curvature of the flexible mirror reflector, an illumination field of view of the flash matches a focal length of an optical system to which the flash is applied. Furthermore, local light filling can be performed on a point in a photographed image. The flash may be used in a phase detection auto focus (Phase Detection Auto Focus, PDAF) process, a contrast (Contrast) detection auto focus (Auto Focus, AF) process, and a facial recognition AF process, to perform precise light filling for a focusing system. This increases focusing precision while reducing a time required for the focusing process, thereby optimizing user experience. By adjusting an inner width of a flash chamber, the illumination field of view of the flash matches the focal length of the optical system to which the flash is applied, thereby further implementing light concentration at a telephoto end and light scattering at a wide-angle end.

Figure 2:
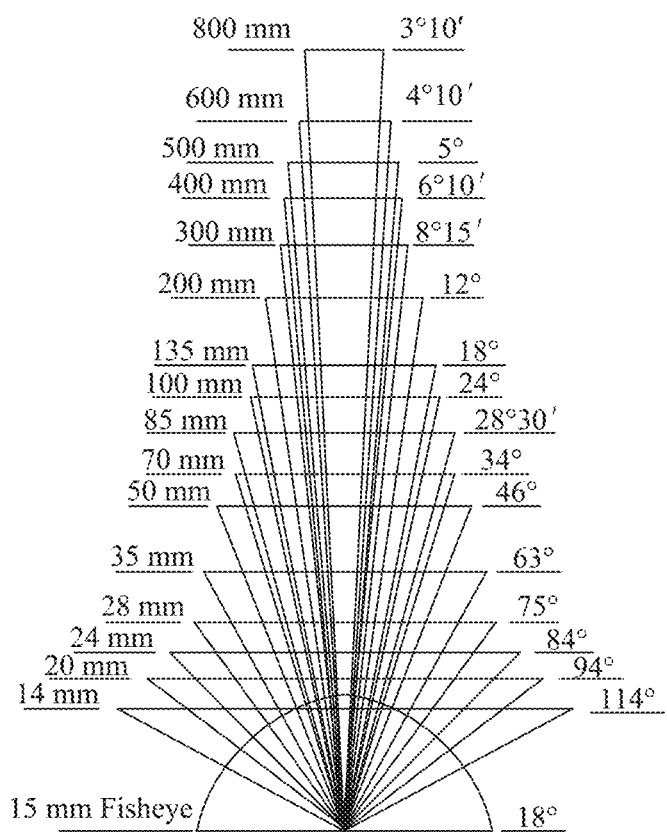
FIG. 2 is a diagram of a relationship between a field of view and a focal length.

FIG. 2 is a diagram of a relationship between a field of view and a focal length. As shown in FIG. 2, when the focal length is 14 mm, the corresponding field of view is 114°. When the focal length is 200 m, the corresponding field of view is 12°. It can be teamed from FIG. 2 that as the focal length increases, the corresponding field of view gradually decreases, and as the focal length decreases, the corresponding field of view gradually increases. In a picture taking or video shooting process, a field of view may be determined by using a relationship between the field of view and a focal length and based on the focal length, to further determine an illumination field of view of a flash. In this way, the flash is fully used. For example, when a focal length is shorter, a field of view is larger, and a larger illumination range of the flash is required. When a focal length is longer, a field of view is smaller, and a smaller illumination range of the flash is required.

Figure 3A:
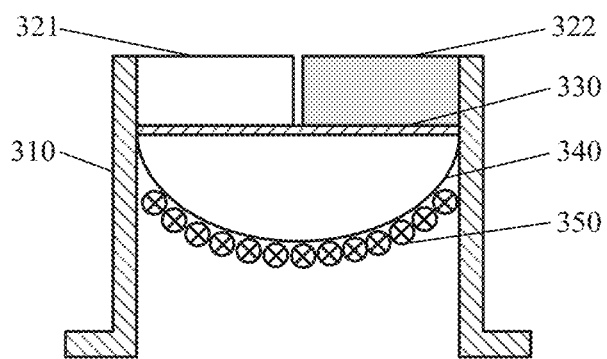
FIG. 3(a) to FIG. 3(c) are schematic structural diagrams of a flash according to an embodiment of the present invention.
Figures 3B, 3C:
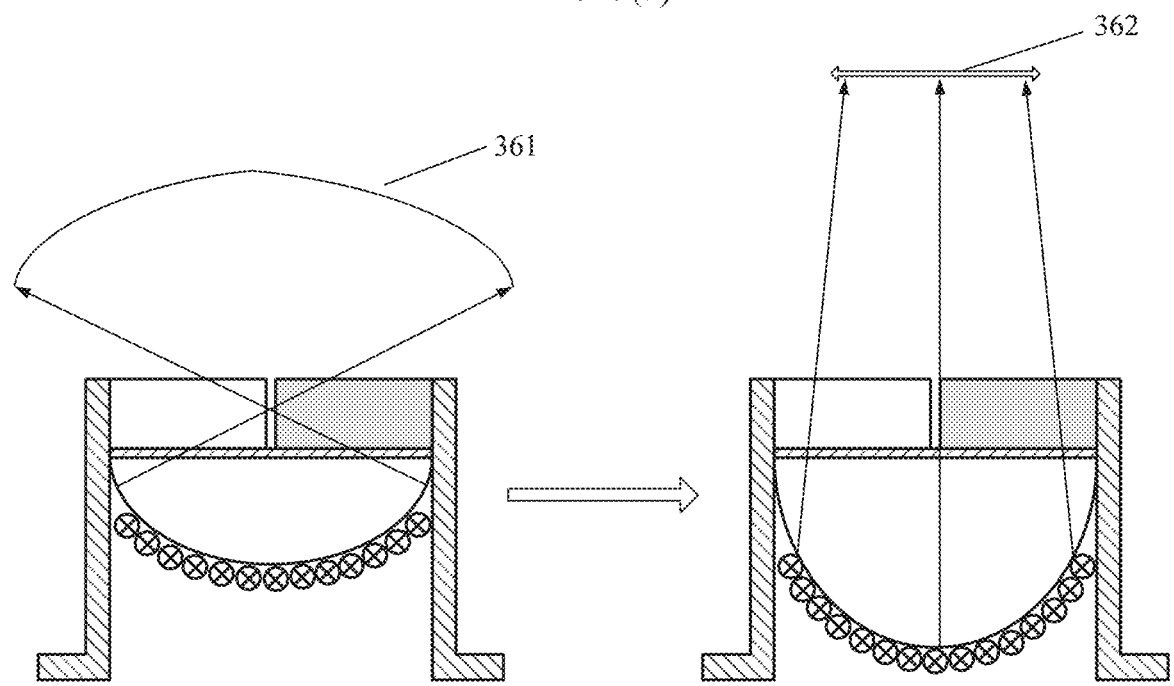
Figure 5A:
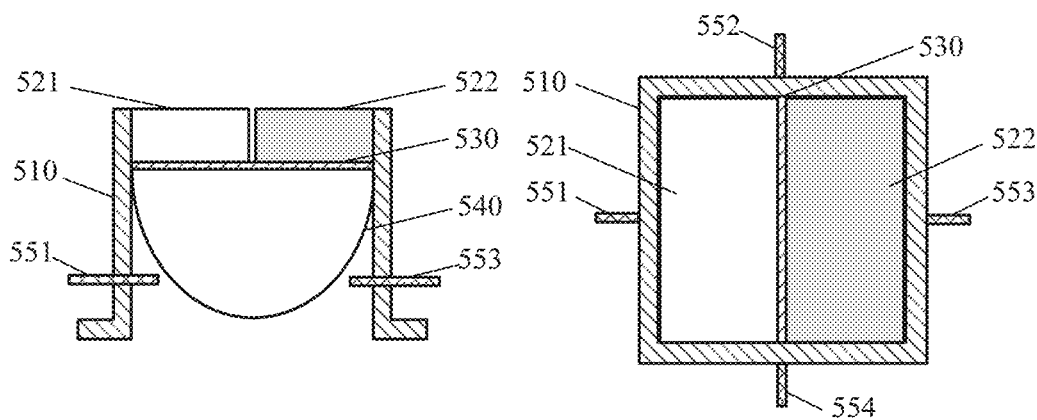
FIG. 5(a) to FIG. 5(f) are schematic structural diagrams of still another flash according to an embodiment of the present invention.
Figure 5B:
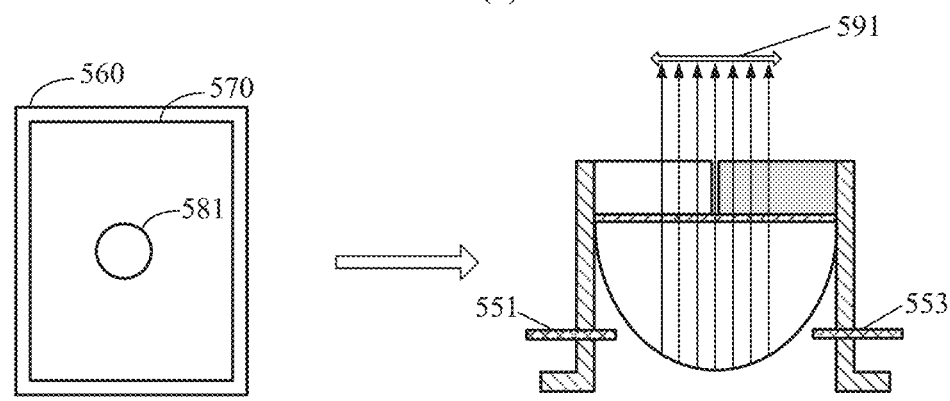
Figure 5C:
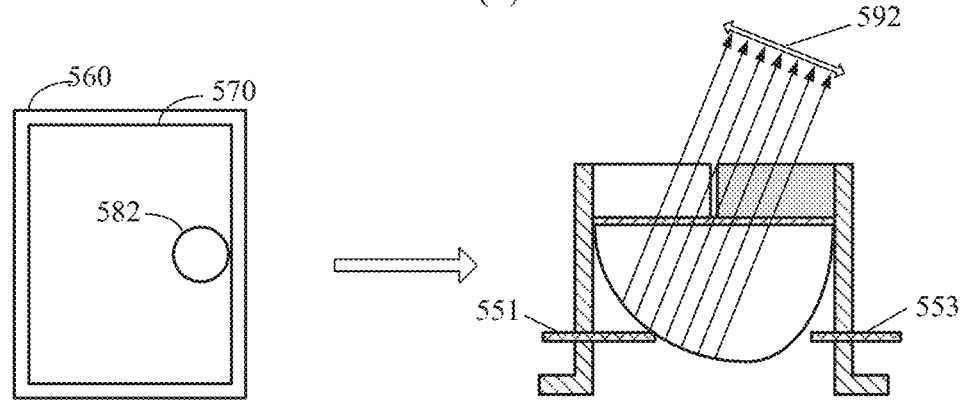
Figure 5D:
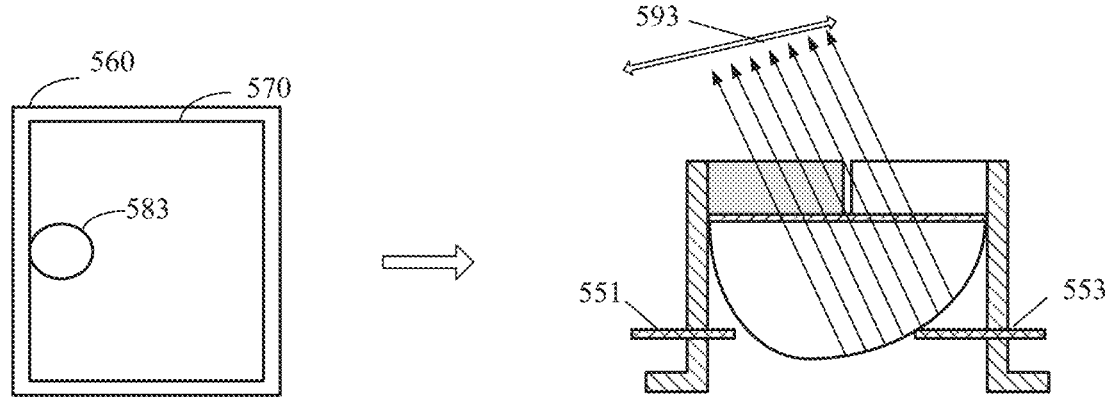
Figure 5E:
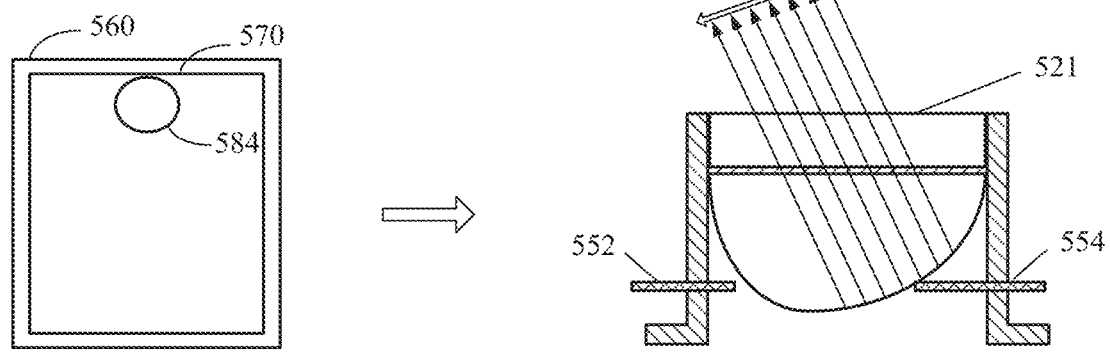
Figure 5F:
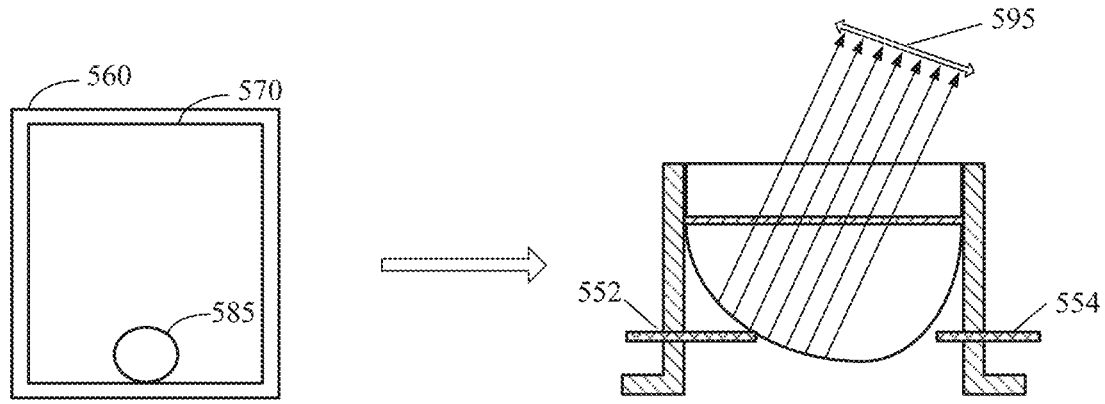

FIG. 3(a) to FIG. 3(c) are schematic structural diagrams of a flash according to an embodiment of the present invention. As shown in FIG. 3(a) to FIG. 3(c), the flash includes a light source module, a flash chamber 310, a flexible mirror reflector 340, and a piezoelectric element 350. The light source module is located inside the flash chamber 310. The light source module includes a substrate 330, a light emitting diode (Light Emitting Diode, LED) 321, and an LED 322. The LED 321 and the LED 322 are located on an upper surface of the substrate 330. The flexible mirror reflector 340 is fixed on a lower surface of the substrate 330. A material of the substrate 330 may be a light-transmissive material such as acrylic glass, so that light emitted from the LED 321 and the LED 322 can be irradiated on an inner surface of the flexible mirror reflector 340. The piezoelectric element 350 covers an outer surface of the flexible mirror reflector 340, and is configured to adjust a curvature of the flexible mirror reflector 340, so that an illumination field of view of the flash matches a focal length of an optical system to which the flash is applied. For example, when the focal length of the optical system is longer, it can be learned based on the relationship between the field of view and the focal length in FIG. 2 that a corresponding field of view is smaller. In this case, if a voltage having a particular magnitude and a particular direction (a forward direction or a reverse direction) is applied to the piezoelectric element 350, the piezoelectric element 350 undergoes corresponding mechanical deformation, thereby controlling change of the curvature of the flexible reflector. For example, after a voltage is applied to the piezoelectric element 350, a shape of the piezoelectric element 350 may be changed from a shape in FIG. 3(*b*) to a shape in FIG. 3(*c*). This also causes the curvature of the flexible mirror reflector 340 that is connected to the piezoelectric element 350 to change. To be specific, a shape of the flexible mirror reflector 340 is stretched from a shape in FIG. 3(*b*) to a shape in FIG. 3(*c*). In this case, an illumination field of view of the flash correspondingly changes from an illumination field of view 361 to an illumination field of view 362.

If the magnitude and the direction of the voltage applied to the piezoelectric element are kept unchanged, the mechanical deformation of the piezoelectric element remains unchanged and the shape of the flexible mirror reflector 340 shown in FIG. 3(*c*) is kept. If the magnitude of the voltage is reduced and the direction of the voltage is kept unchanged, the mechanical deformation of the piezoelectric element is correspondingly reduced, a stretching degree of the flexible mirror reflector 340 is reduced, and the illumination field of view of the flash correspondingly increases. If both the magnitude and the direction of the voltage are changed, a direction and a magnitude of the mechanical deformation of the piezoelectric element are correspondingly changed, and a state of the flexible mirror reflector 340 is changed from in a stretched state to a released state. If the voltage stops being applied to the piezoelectric element, the mechanical deformation of the piezoelectric element disappears accordingly, and the curvature of the flexible mirror reflector 340 returns to an original state. It should be noted that the process in which the shape of the piezoelectric element is changed as the voltage changes is the same as that in the prior art. Details are not described herein again.

It should be noted that the LED is a type of semiconductor diode and is made of a chemical compound formed from gallium (Ga), arsenic (As), phosphorus (P), nitrogen (N), and the like. Visible light can be radiated when electrons and holes are recombined. For example, a gallium arsenide diode emits red light, a gallium phosphide diode emits green light, a silicon carbide diode emits yellow light, and a gallium nitride diode emits blue light. The light source module in this embodiment of the present invention may include only one LED or may include two or more LEDs, and the plurality of LEDs in the light source module may be the same, or may be different from each other, or some LEDs may be the same. For example, the light source module includes three LEDs and the three LEDs are all silicon carbide diodes emitting yellow light. For another example, the light source module includes four LEDs. Two of the LEDs are silicon carbide diodes emitting yellow light and the other two LEDs are gallium nitride diodes emitting blue light. As shown in FIG. 3(*a*) to FIG. 3(*c*), the light source module in this embodiment of the present invention includes the LED 321 and the LED 322. The LED 321 and the LED 322 may form a dual-color temperature flash. For example, the LED 321 is a high-brightness white LED and the LED 322 is an amber LED whose brightness is slightly lower than that of the LED 321. Compared with a common flash including two high-brightness White LEDs, the dual-color temperature flash can provide an optical system with softer imaging, more accurate white balance, and more natural and clearer images, and quality of a photo taken with dark light can be significantly improved.

The flexible mirror reflector may be made of a bendable memory metal. The inner surface of the reflector is a reflective surface on which polishing processing is performed. In addition, chrome plating may be performed on the inner surface and the outer surface of the reflector.

The piezoelectric element includes a piezoelectric component made of a piezoelectric material and a sensor. The piezoelectric material is a crystalline material whose two end faces generate a voltage when the crystalline material is under pressure. The piezoelectric material has a converse piezoelectric effect. The converse piezoelectric effect means that when an electric field is applied in polarization directions of dielectrics, the dielectrics undergo mechanical deformation or mechanical stress in a particular direction. When the external electric field is removed, the deformation or stress disappears. By using the converse piezoelectric effect of the piezoelectric material, the piezoelectric material can be manufactured into a micro-actuator, and the piezoelectric material undergoes deformation through application of the electric field.

It should be noted that in this embodiment of the present invention, the piezoelectric element may not cover the surface of the flexible mirror reflector. Instead, the piezoelectric element is disposed below the flexible mirror reflector. Vertical stretching of the flexible mirror reflector made of a metallic material is controlled by a magnetic force of the piezoelectric element, so that the illumination field of view of the flash matches the focal length of the optical system to which the flash is applied.

According to the flash provided in this embodiment of the present invention, the flexible mirror reflector and the piezoelectric element are used, and the curvature of the flexible mirror reflector is adjusted by using the deformation undergone by the piezoelectric element, so that the illumination field of view of the flash matches the focal length of the optical system to which the flash is applied. Furthermore, local directional light filling can be performed on any point in a framing range.

FIG. 4(*a*) to FIG. 4(*c*) are schematic structural diagrams of another flash according to an embodiment of the present invention. As shown in FIG. 4(*a*) to FIG. 4(*c*), the flash includes a flash module, a flash chamber 410, a flexible mirror reflector 440, and a vertical bar 450. The light source module is located inside the flash chamber 410. The light source module includes a substrate 430, an LED 421, and an LED 422. The LED 421 and the LED 422 are located on an upper surface of the substrate 430. The flexible mirror reflector 440 is fixed on a lower surface of the substrate 430. The vertical bar 450 is connected to the flexible mirror reflector 440, and the vertical bar 450 controls vertical stretching of the flexible mirror reflector by moving vertically, so that an illumination field of view of the flash matches a focal length of an optical system.

For example, one end of the vertical bar 450 is connected to a bottom of the flexible mirror reflector 440 and the other end is connected to a servo motor (not shown). The servo motor controls stretching of the vertical bar 450 to control the vertical stretching of the flexible mirror reflector 440, so that the illumination field of view of the flash matches the focal length of the optical system. For example, when the focal length of the optical system is shorter, it can be learned based on the relationship between the field of view and the focal length in FIG. 2 that a corresponding field of view is larger. In this case, the servo motor controls the stretching of the vertical bar 450 to control the vertical stretching of the flexible mirror reflector. The servo motor controls the vertical bar 450 to move from a position shown in FIG. 4(*b*) to a position shown in FIG. 4(*c*), so that the flexible mirror reflector expands from a shape shown in FIG. 4(*b*) to a shape shown in FIG. 4(*c*), and the illumination field of view of the flash correspondingly changes from an illumination field of view 461 to an illumination field of view 462.

It should be noted that the vertical bar may alternatively not be connected to the bottom of the flexible reflector. Instead, one end of the vertical bar is connected to the servo motor, and the other end is a free end that can move in any direction under the control of the servo motor and push an outer surface of the flexible mirror reflector by moving in a particular direction by a particular distance. This changes a curvature of the flexible mirror reflector and implements local directional light filling on any point in a framing range.

According to the flash provided in this embodiment of the present invention, the flexible mirror reflector and the vertical bar are used, and the vertical stretching of the flexible mirror reflector is controlled by controlling the stretching of the vertical bar, so that the illumination field of view of the flash matches the focal length of the optical system to which the flash is applied. Furthermore, local directional light filling can be performed on any point in a framing range.

FIG. 5(*a*) to FIG. 5(*f*) are schematic structural diagrams of still another flash according to an embodiment of the present invention. As shown in FIG. 5(*a*) to FIG. 5(*f*), the flash includes a flash module, a flash chamber 510, a flexible mirror reflector 540, and at least one horizontal bar. The flash module, that is, a light source module is located inside the flash chamber 510. The flash module, that is, the light source module includes a substrate 530, an LED 521, and an LED 522. The LED 521 and the LED 522 are located on an upper surface of the substrate 530. The flexible mirror reflector 540 is fixed on a lower surface of the substrate 530. A horizontal bar hole is provided in a side wall of the flash chamber 510, the horizontal bar passes through the horizontal bar hole, and the horizontal bar moves to adjust a curvature of the flexible mirror reflector, so that an illumination field of view of the flash matches a focal length of an optical system.

For example, one end of the horizontal bar is connected to a servo motor (not shown), so that the servo motor can control the movement of the horizontal bar. The other end of the horizontal bar pushes an outer surface of the flexible mirror reflector to change the curvature of the flexible mirror reflector, so that the illumination field of view of the flash matches the focal length of the optical system. For example, as shown in FIG. 5(*a*) to FIG. 5(*f*), four horizontal bars, namely, a horizontal bar 551, a horizontal bar 552, a horizontal bar 553, and a horizontal bar 554 are disposed in a horizontal plane. The flash is applied to an optical system of a terminal 560. When the terminal 560 is used for shooting, an image 570 is presented on a display screen of the terminal.

As shown in FIG. 5(*b*), when a central area 581 on the display screen is selected as a focusing area for the image 570, a focus of the optical system is on a central axis of the terminal. In this case, the four horizontal bars do not need to move and are not in contact with the flexible mirror reflector. This increases a light-filling strength of a photographed object corresponding to the central area 581 of the image 570.

As shown in FIG. 5(*c*), when a right area 582 on the display screen is selected as the focusing area for the image 570, the focus of the optical system is on the right of the terminal. In this case, the horizontal bar 552, the horizontal bar 553, and the horizontal bar 554 do not need to move and are not in contact with the flexible mirror reflector. The horizontal bar 551 moves horizontally by a corresponding distance based on a specific position of the focusing area, to push the outer surface of the flexible mirror reflector and change the curvature distribution of the flexible mirror reflector. This increases a light-filling strength of a photographed object corresponding to the right area 582 on the image 570.

As shown in FIG. 5(*d*), when a left area 583 on the display screen is selected as the focusing area for the image 570, the focus of the optical system is on the left of the terminal. In this case, the horizontal bar 551, the horizontal bar 552, and the horizontal bar 554 do not need to move and are not in contact with the flexible mirror reflector. The horizontal bar 553 moves horizontally by a corresponding distance based on a specific position of the focusing area, to push the outer surface of the flexible mirror reflector and change the curvature distribution of the flexible mirror reflector. This increases a light-filling strength of a photographed object corresponding to the right area 583 on the image 570.

As shown in FIG. 5(*e*), when an upper area 584 on the display screen is selected as the focusing area for the image 570, the focus of the optical system is on the upper area on the camera. In this case, the horizontal bar 551, the horizontal bar 552, and the horizontal bar 553 do not need to move and are not in contact with the flexible mirror reflector. The horizontal bar 554 moves horizontally by a corresponding distance based on a specific position of the focusing area, to push the outer surface of the flexible mirror reflector and change the curvature distribution of the flexible mirror reflector. This increases a light-filling strength of a photographed object corresponding to the upper area 584 of the image 570.

As shown in FIG. 5(*f*), when a lower area 585 on the display screen is selected as the focusing area for the image 570, the focus of the optical system is on the lower area on the camera. In this case, the horizontal bar 551, the horizontal bar 553, and the horizontal bar 554 do not need to move and are not in contact with the flexible mirror reflector. The horizontal bar 552 moves horizontally by a corresponding distance based on a specific position of the focusing area, to push the outer surface of the flexible mirror reflector and change the curvature distribution of the flexible mirror reflector. This increases a light-filling strength of a photographed object corresponding to the lower area 585 of the image 570.

For another example, the horizontal bars may work in cooperation with each other based on the specific position of the focusing area. For example, the horizontal bar 551 and the horizontal bar 552 do not move, while the horizontal bar 553 and the horizontal bar 554 both move by a particular distance, to push the outer surface of the flexible mirror reflector and change the curvature distribution of the flexible mirror reflector. This increases a light-filling strength of a photographed object corresponding to the focusing area of the image.

It should be noted that in the foregoing description, image photographing is used as an example. The foregoing method is also applicable to video shooting. Details are not described herein.

It should be noted that the horizontal bars may move only horizontally, or may move in any direction under the control of a servo motor, and push the outer surface of the flexible mirror reflector by moving in a particular direction by a particular distance, to change the curvature of the flexible mirror reflector, so that the illumination field of view of the flash matches the focal length of the optical system to which the flash is applied, and local directional light filling can be performed on any point in a framing range. For example, when the focal length of the optical system increases, and a plurality of horizontal bars work in cooperation with each other, the flexible mirror reflector stretches vertically. This reduces an angle of the illumination field of view of the flash to match the illumination field of view and the increased focal length.

According to the flash provided in this embodiment of the present invention, the flexible mirror reflector and the horizontal bar are used, and the curvature of the flexible mirror reflector is adjusted by moving the horizontal bar, so that the illumination field of view of the flash matches the focal length of the optical system to which the flash is applied. Furthermore, local directional light filling can be performed on any point in a framing range.

Figure 6:
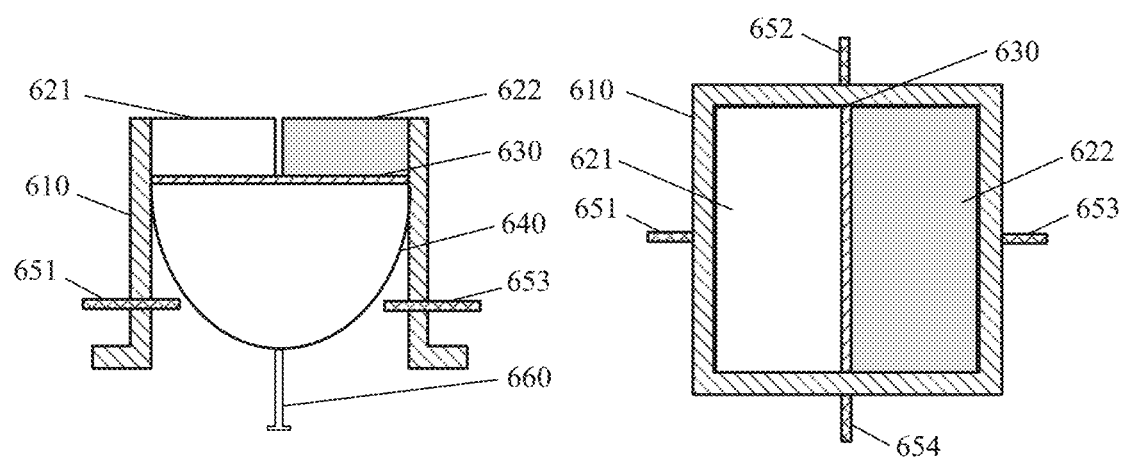
FIG. 6 is a schematic structural diagram of yet another flash according to an embodiment of the present invention.

FIG. 6 is a schematic structural diagram of yet another flash according to an embodiment of the present invention. As shown in FIG. 6, the flash includes a flash module, a flash chamber 610, a flexible mirror reflector 640, a vertical bar 660, and at least one horizontal bar. The light source module is located inside the flash chamber 610. The light source module includes a substrate 630, an LED 621, and an LED 622. The LED 621 and the LED 622 are located on an upper surface of the substrate 630. The flexible mirror reflector 640 is fixed on a lower surface of the substrate 630. A horizontal bar hole is provided in a side wall of the flash chamber 610. The horizontal bar passes through the horizontal bar hole. The horizontal bar moves to adjust a curvature of the flexible mirror reflector 640. The vertical bar 660 is connected to the flexible mirror reflector and controls vertical stretching of the flexible mirror reflector by moving vertically. The vertical bar and the horizontal bar work in cooperation with each other, so that the illumination field of view of the flash matches a focal length of an optical system and precise local light filling is achieved.

For example, one end of the vertical bar is connected to a bottom of the flexible mirror reflector and the other end is connected to a servo motor (not shown).

For example, one end of the horizontal bar is connected to the servo motor (not shown), so that the servo motor can control movement of the horizontal bar, and the other end of the horizontal bar is in contact with an outer surface of the flexible mirror reflector to change the curvature of the flexible mirror reflector. For example, as shown in FIG. 6, four horizontal bars, namely, a horizontal bar 651, a horizontal bar 652, a horizontal bar 653, and a horizontal bar 654 are disposed in a horizontal plane.

For example, the LED 621 and the LED 622 stay lit during video shooting, and brightness of the LED 621 and the LED 622 can be controlled by controlling currents. Further, movement of the horizontal bar and the vertical bar is controlled, so that real-time light filling is implemented during the video shooting. In this way, user experience of performing high-definition video shooting in a dark environment is significantly improved.

According to the flash provided in this embodiment of the present invention, the flexible mirror reflector, the vertical bar, and the horizontal bar are used, and the curvature of the flexible mirror reflector is adjusted by moving the horizontal bar and the vertical bar in cooperation, so that the illumination field of view of the flash matches the focal length of the optical system to which the flash is applied. Furthermore, local directional light filling can be performed on any point in a framing range.

FIG. 7(a) to FIG. 7(d) are schematic structural diagrams of a flash according to an embodiment of the present invention. As shown in FIG. 7(a) to FIG. 7(d), the flash includes a light source module, a flash chamber 710, and a piezoelectric element 760. The light source module is located inside the flash chamber 710. The light source module includes a substrate 730, an LED 721, and an LED 722. An inner surface of a side wall of the flash chamber is a reflective surface 740. The piezoelectric element 760 controls horizontal stretching of the flash chamber 710, to be specific, controls an inner width of the flash chamber 710, so that an illumination field of view of the flash matches a focal length of an optical system. For example, when the focal length of the optical system is longer, it can be learned based on the relationship between the field of view and the focal length in FIG. 2 that a corresponding field of view is smaller. In this case, if the piezoelectric element controls the inner width of the flash chamber 710 to change, that is, enables the flash chamber 710 to expand outward from a position shown in FIG. 7(b) to a position shown in FIG. 7(c), a corresponding illumination field of view of the flash changes from an illumination field of view 771 to an illumination field of view 772.

Figure 7A:
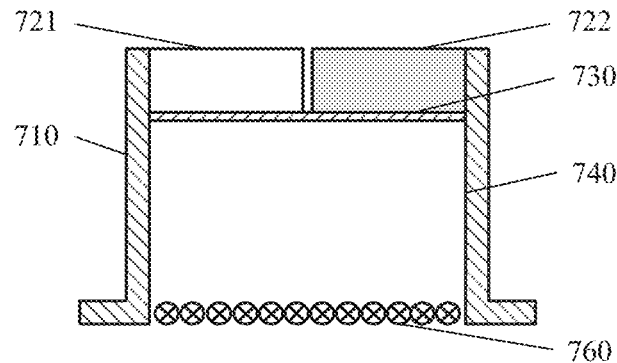
FIG. 7(a) to FIG. 7(d) are schematic structural diagrams of a flash according to an embodiment of the present invention.
Figures 7B, 7C:
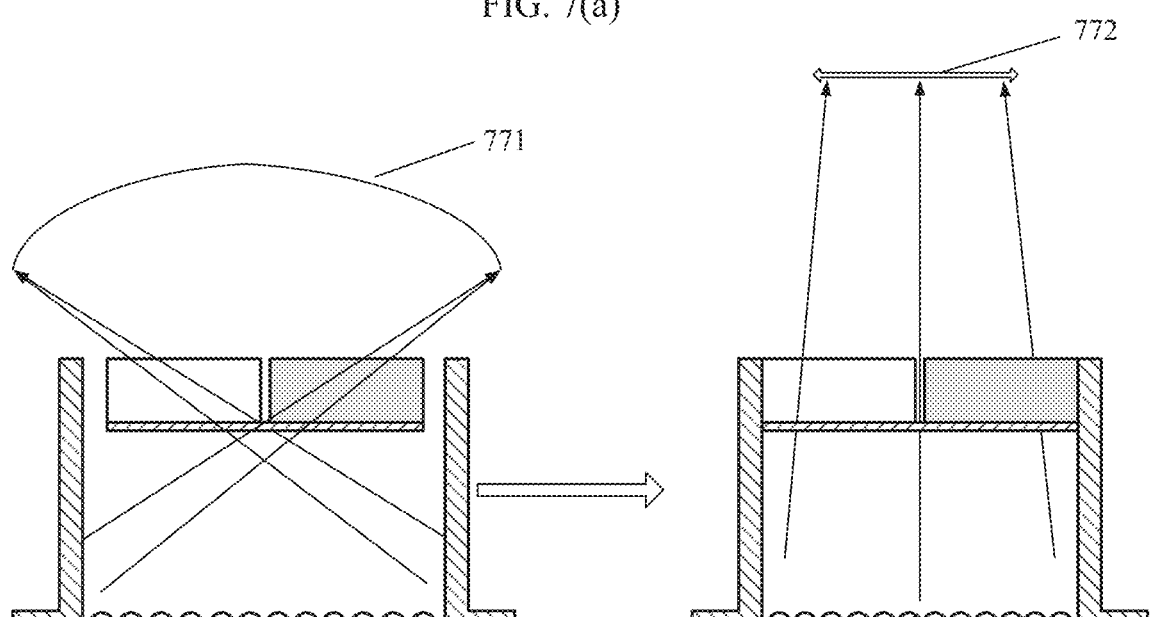
Figure 7D:
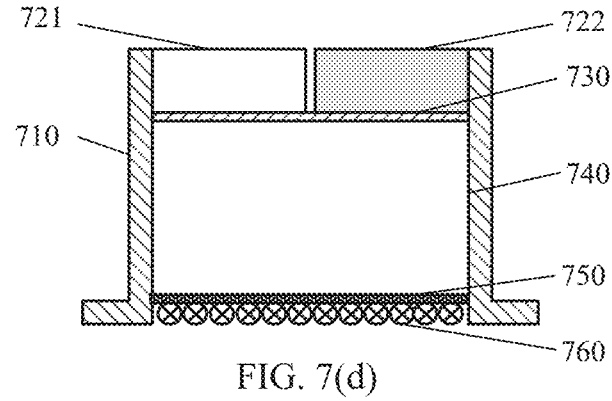

For example, as shown in FIG. 7(d), a reflective surface 750 is disposed on the piezoelectric element 760. The reflective surface 750 may be configured to reflect light emitted from the LED 721 and the LED 722.

It should be noted that the light source module and the piezoelectric element may be supported by using a bracket. A specific bracket is not drawn in the figure. For example, a through hole or a blind hole is provided in an inner wall of the flash chamber and a slide is provided, so that an inner side of the flash chamber may move outward or inward.

According to the flash provided in this embodiment of the present invention, the width of the inner wall of the flash chamber is changed by using the piezoelectric element, so that the illumination field of view of the flash is adjusted, and the illumination field of view of the flash matches the focal length of the optical system to which the flash is applied.

Figure 8:
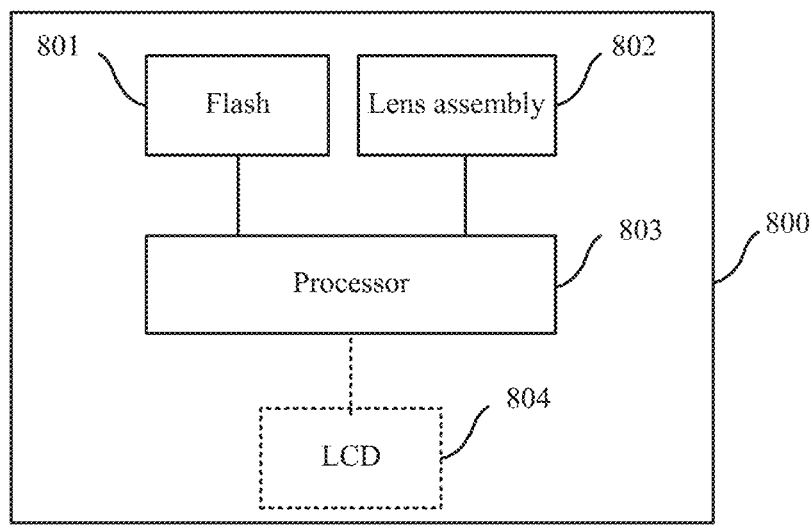
FIG. 8 is a schematic structural diagram of an optical system according to an embodiment of the present invention.

FIG. 8 is a schematic structural diagram of an optical system according to an embodiment of the present invention. The optical system may be applied to a terminal such as a mobile phone, a tablet computer, or a camera. As shown in FIG. 8, the optical system 800 includes a flash 801, a lens assembly 802, and a processor 803 provided in this embodiment of the present invention. The processor 803 is configured to control the flash 801 and the lens assembly 802, to implement zoom linkage between the flash 801 and the lens assembly 802.

For example, the optical system 800 may further include a liquid crystal display (Liquid Crystal Display, LCD). The LCD 804 is configured to display a current focal length and a current light-filling strength, that is, a matching degree between guide numbers (Guide Number, GN) of the flash. For example, when a current environment is dim and local light filling needs to be performed on a point in a framing range, if brightness is still inadequate after the flash performs light filling on the point according to an instruction, the LCD may display a relatively low matching degree, for example, 0.5, between a current focal length and a current light-filling strength and prompt a user to provide other light filling or reduce a distance between the user and a photographed object to increase brightness, thereby providing a better photographing effect.

According to the optical system provided in this embodiment of the present invention, the flash that enables the illumination field of view of the flash to match the focal length of the optical system to which the flash is applied and that can perform local directional light filling on any point in a framing range is used. Furthermore, the liquid crystal display LCD may be configured to display the matching degree between the current focal length and the current light-filling strength, so as to prompt a user to perform a corresponding operation to adjust brightness of an image. This provides a better photographing effect.

The flash and the optical system provided in the present invention may be applied to a terminal (for example, a mobile phone, a tablet computer, or a camera). When the terminal includes the flash or the optical system, the flash or the optical system may adopt the structure provided in any embodiment of the present invention.

Figure 9:
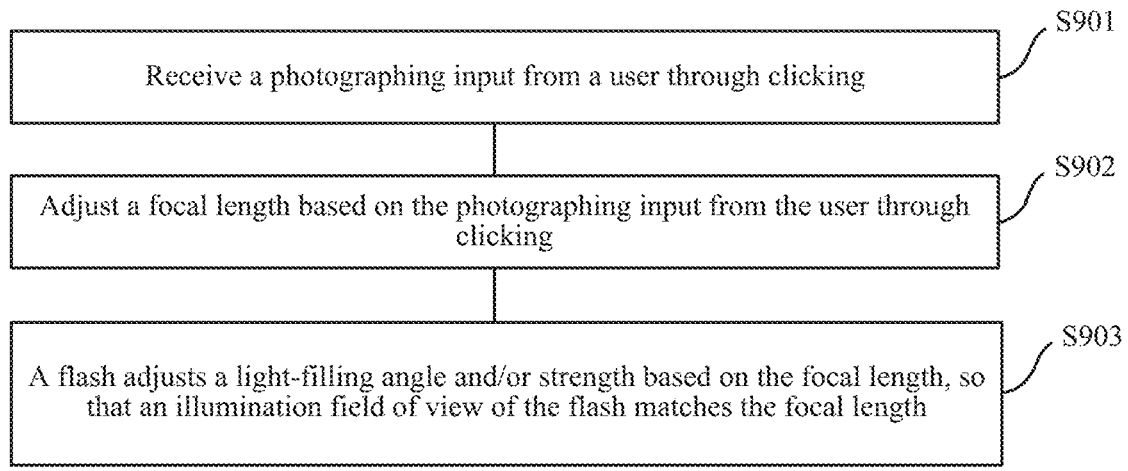
FIG. 9 is a flowchart of a flash adjustment method according to an embodiment of the present invention.

FIG. 9 is a flowchart of a flash adjustment method according to an embodiment of the present invention. As shown in FIG. 9, the method may be applied to the flash in the foregoing embodiments of the present invention, and includes steps S901 to S903.

Step S901: Receive a photographing input from a user through clicking.

Step S902: Adjust a focal length based on the photographing input from the user through clicking.

Step S903: The flash adjusts a light-filling angle and/or strength based on the focal length, so that an illumination field of view of the flash matches the focal length.

According to the flash adjustment method in this embodiment of the present invention, after the photographing input from the user through clicking is received, the focal length is adjusted based on the photographing input from the user through clicking. In addition, the flash adjusts the light-filling angle and/or strength based on the focal length, to implement smart linkage with the adjustment of a photographing focal length by the user. The flash automatically adjusts an illumination range and brightness as the focal length adjusted by the user changes. In this way, precise small-area light filling (for example, light filling is performed only on a face during photographing of a person), macrophotography, and the like are implemented.

In the foregoing specific implementations, the objective, technical solutions, and benefits of the present invention are further described in detail, it should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A light filling method, wherein the light filling method is implemented in a terminal comprising a flash coupled to a camera and a display, and wherein the light filling method comprises:
    obtaining, by the camera, a current environment;
    displaying, the current environment in the display;
    displaying, a focal length and a light-filling strength on a point;
    displaying a matching degree between the focal length and the light-filling strength;
    receiving, by the display, an instruction from a user through clicking to perform light filling on the point;
    filling, by the flash, the light-filling strength; and
    adjusting, by the camera, the focal length on the point.

2. The light filling method of claim 1, wherein filling by the flash further comprises:
    adjusting a curvature of a flexible mirror reflector to cause an illumination field of view of the flash to match a focal length of the optical system.

3. The light filling method of claim 2, further comprising activating a piezoelectric element configured to adjust the curvature of the flexible mirror reflector.

4. The light filling method of claim 2, further comprising controlling curvature of the flexible mirror reflector by moving a vertical bar coupled with a surface of the flexible mirror reflector.

5. The light filling method of claim 2, further comprising moving a horizontal bar coupled with a side wall of the flash chamber to adjust the curvature of the flexible mirror reflector.

6. The light filling method of claim 2, wherein adjusting the curvature of the flexible mirror reflector comprises adjusting the flexible mirror reflector to assume a parabolic shape.

7. The light filling method of claim 1, further comprising, when the matching degree is lower than a preset value, prompting the user to adjust light filling or reduce a distance between the user and a photographed object of the current environment.

8. A flash, for use in an optical system and comprising:
    a flash chamber, wherein an inner surface of a side wall of the flash chamber comprises a first reflective surface;
    a piezoelectric element configured to control the flash chamber to stretch horizontally to match an illumination field of view of the flash to a focal length of the optical system; and
    a light source located inside the flash chamber, wherein the light source comprises a substrate and a light emitting diode (LED) on an upper surface of the substrate, wherein the optical system comprises a liquid crystal display (LCD) configured to display a degree of matching between the focal length and a light-filling strength of the flash.

9. The flash of claim 8, further comprising a second reflective surface disposed above the piezoelectric element.

10. The flash of claim 9, wherein the second reflective surface comprises a parabolic shape.

11. The flash of claim 9, further comprising a piezoelectric element coupled with a surface of the second reflective surface in a configuration for changing its shape.

12. The flash of claim 9, wherein the flash further comprises a piezoelectric element on an outer surface of the second reflective surface and configured to adjust a curvature of the second reflective surface.

13. The flash of claim 9, wherein a curvature of the second reflective surface is configured to adjust to a parabolic shape.

14. A flash adjustment method, comprising:
    receiving a photographing input from a user;
    determining a focal length based on the photographing input;
    displaying a matching degree between the focal length and a light-filling strength on the photographing input; and adjusting, by a flash, a light-filling angle based on the focal length to match an illumination field of view of the flash to the focal length.

15. The flash adjustment method of claim 14, wherein adjusting the light-filling angle comprises illuminating a light emitting diode (LED).

16. The flash adjustment method of claim 14, further comprising adjusting, by the flash, a light strength based on the focal length to match the illumination field of view to the focal length.

17. The flash adjustment method of claim 14, further comprising adjusting a curvature of a flexible mirror reflector to match the illumination field of view of the flash to the focal length.

18. The flash adjustment method of claim 17, wherein adjusting the curvature of the flexible mirror reflector comprises actuating a piezoelectric element on an outer surface of the flexible mirror reflector.

19. The flash adjustment method of claim 17, wherein adjusting the curvature of the flexible mirror reflector comprises actuating a piezoelectric element adjacent to an outer surface of the flexible mirror reflector.

20. The flash adjustment method of claim 17, wherein adjusting the curvature of the flexible mirror reflector comprises adjusting the flexible mirror reflector to assume a parabolic shape.

* * * * *